(12) United States Patent
Himmelstoss et al.

(10) Patent No.: US 12,313,736 B2
(45) Date of Patent: May 27, 2025

(54) METHOD FOR LOW-INTERFERENCE OPERATION OF A PLURALITY OF RADAR SENSORS

(71) Applicant: Robert Bosch GmbH, Stuttgart (DE)

(72) Inventors: Armin Himmelstoss, Weissach im Tal (DE); Gor Hakobyan, Stuttgart (DE); Patrick Doll, Rutesheim (DE); Stefan Engewald, Osterburken (DE); Tim Poguntke, Durach (DE); Werner Soergel, Pforzheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 417 days.

(21) Appl. No.: 17/762,937

(22) PCT Filed: Sep. 15, 2020

(86) PCT No.: PCT/EP2020/075740
§ 371 (c)(1),
(2) Date: Mar. 23, 2022

(87) PCT Pub. No.: WO2021/069180
PCT Pub. Date: Apr. 15, 2021

(65) Prior Publication Data
US 2022/0390583 A1    Dec. 8, 2022

(30) Foreign Application Priority Data

Oct. 8, 2019  (DE) .................... 10 2019 215 358.5

(51) Int. Cl.
*G01S 13/931*    (2020.01)
*G01S 7/02*      (2006.01)
(Continued)

(52) U.S. Cl.
CPC ............ *G01S 13/931* (2013.01); *G01S 7/023* (2013.01); *G01S 7/0232* (2021.05);
(Continued)

(58) Field of Classification Search
None
See application file for complete search history.

(56) References Cited

U.S. PATENT DOCUMENTS

| 5,907,293 A * | 5/1999 | Tognazzini | ............ G08G 1/166 340/436 |
| 11,275,174 B2 * | 3/2022 | Smith | ..................... G01S 7/023 |

(Continued)

FOREIGN PATENT DOCUMENTS

| CN | 107076845 A | 8/2017 |
| CN | 107991650 A | 5/2018 |

(Continued)

OTHER PUBLICATIONS

International Search Report for PCT/EP2020/075740, Issued Nov. 23, 2020.

*Primary Examiner* — Olumide Ajibade Akonai
*Assistant Examiner* — David C. Schultz
(74) *Attorney, Agent, or Firm* — NORTON ROSE FULBRIGHT US LLP

(57) ABSTRACT

A method for low-interference operation of a plurality of radar sensors, which are installed in different vehicles and each emit a transmission signal in an operating range, which is characterized by at least one of the following parameters: frequency, coding, activity time window. Each radar sensor is assigned an operating range according to at least one degree of freedom of movement of the vehicle, in which the radar sensor is installed.

11 Claims, 5 Drawing Sheets

(51) Int. Cl.
*G01S 13/58* (2006.01)
*G01S 13/60* (2006.01)

(52) U.S. Cl.
CPC .......... *G01S 7/0234* (2021.05); *G01S 7/0235* (2021.05); *G01S 7/0236* (2021.05); *G01S 13/582* (2013.01); *G01S 13/60* (2013.01)

(56) References Cited

U.S. PATENT DOCUMENTS

| | | |
|---|---|---|
| 2002/0003488 A1 | 1/2002 | Levin et al. |
| 2016/0061935 A1* | 3/2016 | McCloskey ............. G01S 13/08 342/82 |
| 2016/0223643 A1* | 8/2016 | Li ......................... G01S 7/0236 |
| 2020/0025865 A1* | 1/2020 | Gulati ..................... G01S 13/42 |
| 2021/0133218 A1* | 5/2021 | Bukowski ............. G06F 16/288 |
| 2021/0270951 A1* | 9/2021 | Yoshizawa ............ H04W 72/12 |

FOREIGN PATENT DOCUMENTS

| | | |
|---|---|---|
| JP | 2008298736 A | 12/2008 |
| JP | 2017529525 A | 10/2017 |
| WO | 2016032780 A1 | 3/2016 |

* cited by examiner

METHOD FOR LOW-INTERFERENCE OPERATION OF A PLURALITY OF RADAR SENSORS

FIELD

The present invention relates to a method for low-interference operation of a plurality of radar sensors, which are installed in different vehicles and each emit a transmission signal in an operating range, which is characterized by at least one of the following parameters: frequency, coding, activity time window.

BACKGROUND INFORMATION

In motor vehicles, radar sensors are used as locating devices, by which the traffic field is monitored. The location data across the traffic field form the basis of different assistance functions, such as cruise control, automatic emergency braking systems, automatic parking, and the like. In the course of the development of autonomous vehicles, the assistance systems are gradually expanded to form driving systems, which are able to control the vehicle autonomously without the action of a human driver.

With increasing automation of motor vehicles, the number of motor vehicles, which are equipped with radar sensors, will increase in the same manner as the number of radar sensors, which are incorporated within the same vehicle. This increases the probability that a radar sensor receives not only radar echoes, which result from its own transmission signal, but also radar signals of radar sensors of other vehicles, either directly or after reflection by an object. Due to the interference of radar signals coming from different sources, noise signals are generated, which make the correct interpretation of the received signals more difficult and may consequently result in the malfunction or decreased performance of the radar sensors.

In general, a radar sensor only emits radar signals within a particular frequency band, and disruptive interference is only then to be expected to a considerable extent, if two radar sensors operate in the same frequency band.

In most radar sensors, the transmitting and receiving parts are also not constantly active, but only within certain time windows, between which are "transmission breaks," in which the received signals are evaluated. If the activity time windows of the transmitting and receiving parts are coordinated in such a manner, that one radar sensor transmits while the other radar sensor has a transmission break, then interference may be prevented, as well.

In addition, radar sensors, which operate using coded transmission signals, are in development. The coding allows different transmission signals within the same frequency band to be distinguished from each other. Therefore, interference may be prevented, in principle, since the radar sensors operate, using signals coded differently.

The range of frequencies and/or activity time windows and/or coding, which are used in a single radar sensor, shall be referred to, in summary, as an operating range. In general, then, one strategy for preventing interference is to allow the different radar sensors to operate in different operating ranges. However, the number of available operating ranges (frequencies, time windows, and coding) is nowhere near enough to reserve a separate operating range for each radar sensor of each vehicle.

SUMMARY

Even in view of a limited number of available operating ranges, the object of the present invention is to specify a method, which allows the frequency of instances of interference between different radar sensors to be reduced.

This object of the present invention may be achieved by assigning each radar sensor an operating range according to at least one degree of freedom of movement of the vehicle, in which the radar sensor is installed.

The degrees of freedom of movement of a vehicle characterize the location and/or the orientation of the vehicle in a global coordinate system. Since the operating ranges are assigned as a function of these degrees of freedom of movement, then, for example, the radar sensors of two vehicles, which are approximately at the same location, may be assigned different operating ranges, so that interference is prevented. However, in the case of vehicles, which are spatially far away from each other, the radar sensors may operate in the same operating range without having to fear interference. The assignment of the operating ranges may equally be a function of the orientation of the vehicles, for example, in such a manner, that radar sensors of two vehicles are assigned different operating ranges, if the two radar sensors are pointed forwards with regard to their respective vehicles and the orientations of the two vehicles are opposed to each other. Thus, if each radar sensor directly receives the signal transmitted by the other sensor, this does not result in interference. The same also applies analogously to pairs of radar sensors, which have other orientations with regard to their respective vehicles.

Advantageous embodiments and further refinements of the present invention are disclosed herein.

An operating range of a given radar sensor may be characterized by a frequency band, in which the transmitted signal lies, or, in the case of coded signals, by a set of code symbols, which the radar sensor transmits. An operating range may also be characterized by different combinations of frequency bands and coding, as well.

In addition, an operating range may be characterized by certain activity time windows, within which the transmitting and receiving part of the radar sensor is active. In this case, however, the radar sensors of the different vehicles must be synchronized with each other, in order to ensure that the activity time windows remain separate from each other. Any time signal receivable wirelessly may be used for synchronization, for example, a signal of a global navigation satellite system (GNSS) (e.g., GPS), a time signal of a cellular network, or even a radio clock signal. The time signal does not have to be constantly receivable, but it is sufficient if the local time of the vehicle and/or of the radar sensor is synchronized with the time signal at certain intervals.

An operating range of a radar sensor may also be characterized by a combination of a particular selection of the activity windows and a frequency band and/or coding.

If the vehicles each have a navigation system, then the operating range may be assigned on the basis of local degrees of freedom. For example, in a digital map used by the navigation system, two or more operating ranges may be defined for each road in such a manner, that the operating ranges valid for the two directions of travel on this road are different from each other. In this manner, the radar signals of two vehicles, which meet on this road, are prevented from interfering with each other.

Another option for preventing interference in the case of vehicles encountering each other, is that the operating ranges are assigned as a function of the orientation of the vehicle and/or of the radar sensor relative to the northern direction, namely, in such a manner, that radar sensors, which are installed in two different vehicles and have orientations opposite to each other (determined by the orientation of the radar sensor relative to the forward direction of the vehicle and the orientation of the vehicle with respect to the northern direction), have different operating ranges. In this case, the vehicles do not even have to have a navigation system, but it is sufficient, in principle, for an adequately accurate compass function to be available.

The frequency bands selected as a function of angle are also allowed to overlap each other, but preferably only at the edges. Since, during the signal evaluation, the received radar signals are normally subjected to windowing in the frequency space, the received signals are already suppressed to a certain extent at the edges of the frequency band, and consequently, interference with signals of other radar sensors is also suppressed.

The assignment of the frequency bands to the different orientation directions of the sensor is preferably selected in such a manner, that the closer the angular difference between the two orientation directions is to 180°, the smaller the overlap of the frequency bands.

Due to a similar effect, the activity time windows of different radar sensors may also overlap each other at least at the edge. In this case, as well, e.g., in a FMCW radar, the windowing across several rapid chirp ramps (in a dimension of a two-dimensional Fourier transformation) results in marked suppression of interference.

In the following, exemplary embodiments are explained in greater detail in light of the figures.

DETAILED DESCRIPTION OF EXAMPLE EMBODIMENTS

Figure 1:
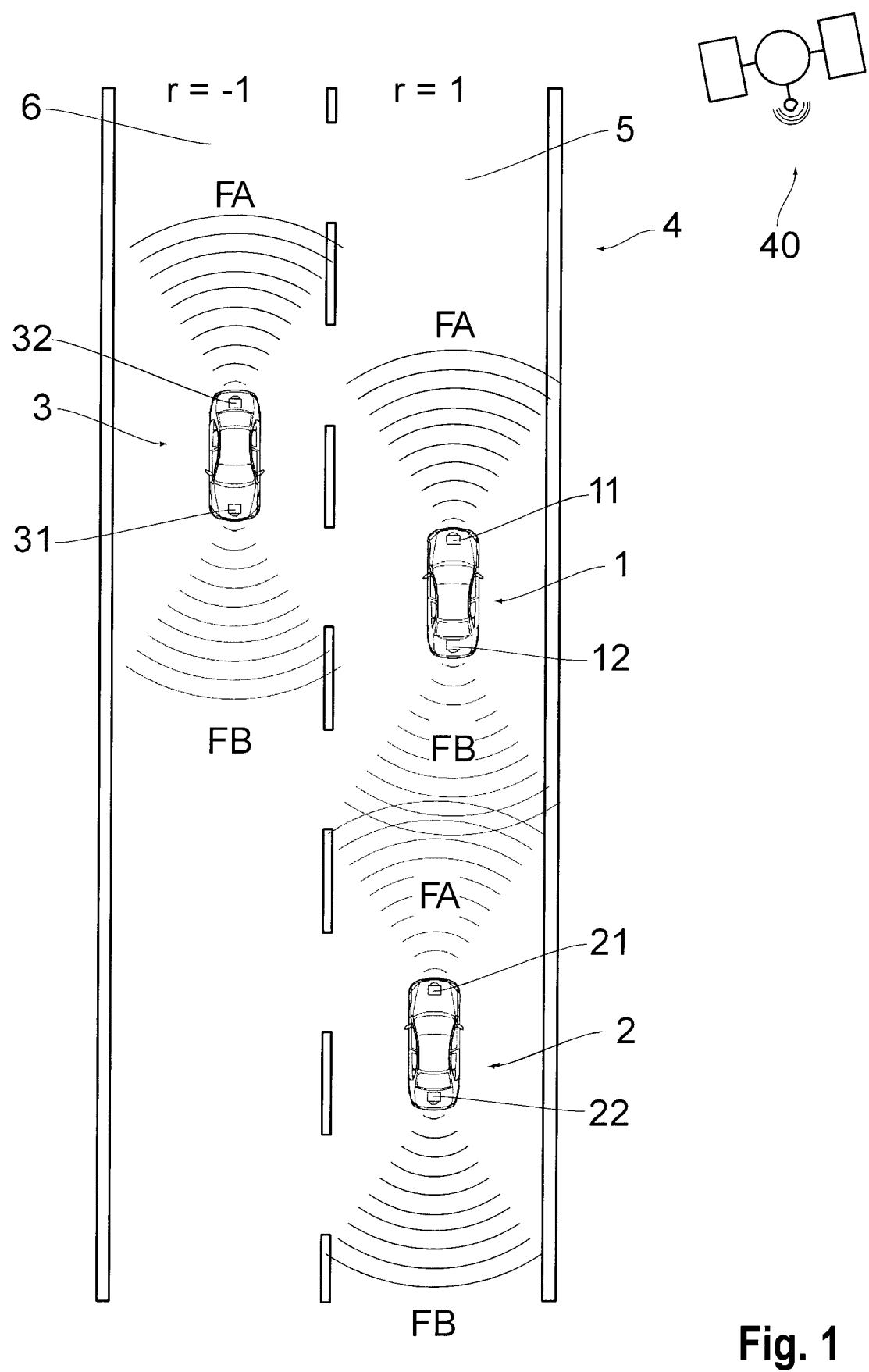
FIG. 1 shows a sketch of a traffic situation for explaining the method of the present invention.

A traffic situation, in which three vehicles 1, 2, 3 travel on a road 4 that has one traffic lane 5, 6 for each direction of travel, is shown in FIG. 1. Vehicles 1 and 2 travel in the same direction in traffic lane 5, and vehicle 3 comes towards them in lane 6.

At the front end, vehicle 1 has a radar sensor 11 pointed forwards in the direction of travel, and at the rear end, it has a radar sensor 12 pointed backwards in the direction of travel. Vehicles 2 and 3 also have the same set-up of radar sensors 21, 22 and 31, 32, respectively. The radar lobes of the radar sensors are each indicated by stylized waves.

Each of the three vehicles 1, 2, 3 has its own onboard navigation system, which communicates with GPS satellites 40. Information about the road 4 currently traveled on by the vehicle, as well as about the direction of travel of the reference vehicle, is present in the navigation system.

In the situation shown in FIG. 1, radar sensor 12 of vehicle 1 and radar sensor 21 of vehicle 2 face each other in such a manner, that radar sensor 12 directly receives the radar waves, which are transmitted by radar sensor 21, and vice versa. Therefore, if the two sensors were to operate in the same frequency band, malfunctions would occur in both sensors due to interference.

Such interference would have to be expected in the pair of radar sensors 21 and 31.

If vehicle 3 passes vehicle 2 at a somewhat later time, then radar sensors 22 and 32 also face each other, which means that interference may occur here, as well. In FIG. 1, radar sensors 11 and 22 of vehicles 1 and 2 are actually pointed away from each other, which means that no disturbances are to be expected. However, it may not be ruled out that vehicle 2 overtakes vehicle 1 later, and then, interference could also occur between radar sensors 11 and 22.

The radar lobes of radar sensors 11, 21, and 32 all point in the same direction, which means that in this case, there is at least no direct signal transmission by one sensor to the other. Interference could occur, at most, to a low degree due to reflections of the radar signals. The same is also true for the three radar sensors 12, 22 and 31.

In order for the risk of malfunctions due to interference to be reduced, radar sensors 11, 21 and 32 operate in one frequency band FA, and radar sensors 12, 22 and 31 operate in another frequency band FB. Frequency bands FA and FB are staggered so far, that there is no overlap. Since each radar sensor only reacts to received signals, whose frequency lies in its frequency band, disruptive interference is prevented.

In order to ensure that each radar sensor operates in the correct frequency band, lane 5 is assigned a directional parameter r=1, while lane 6 is assigned a directional parameter r=−1. The radar sensors 11, 21, and 31 pointed forwards in the direction of travel are now assigned an operating range A having frequency band FA, if the directional parameter r for the lane, in which the corresponding vehicle is located, has a value of 1; and assigned an operating range B having frequency band FB, if the directional parameter has a value of −1. In the case of the radar sensors 12, 22 and 32 pointing backwards in the direction of travel, the assignment of operating ranges A and B is exactly the opposite.

Figure 2:
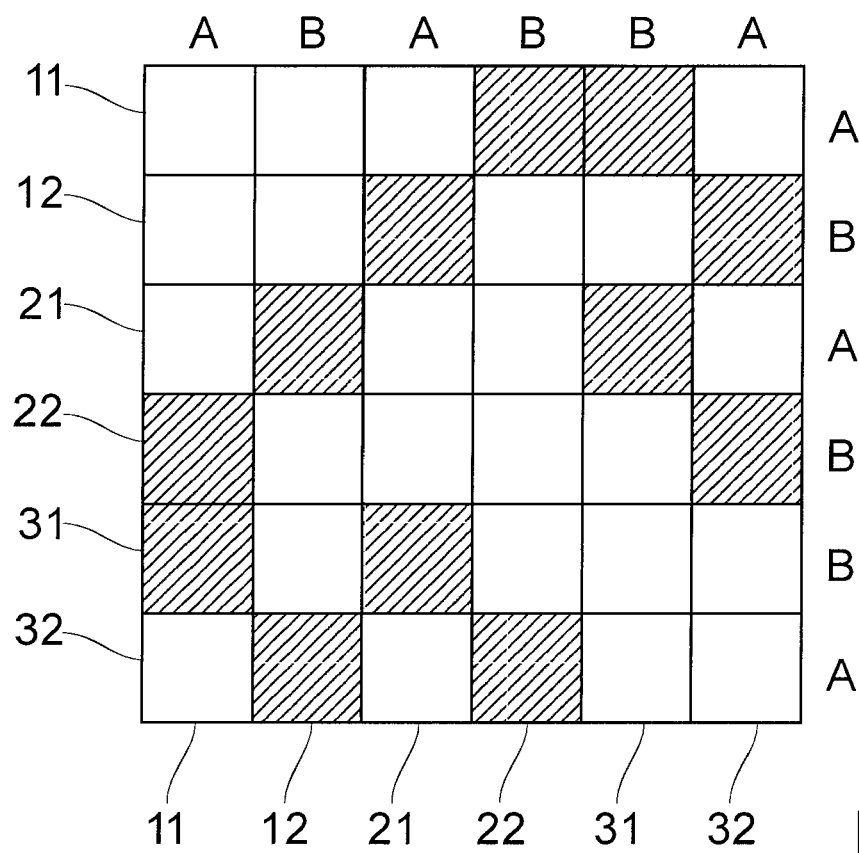
FIG. 2 shows a matrix for representing interference to be expected between radar sensors in the traffic situation shown in FIG. 1.

The pairings of radar sensors 11-32, which are "hostile" to each other in the sense that a high risk of interference is present, are shown in a matrix in FIG. 2. These pairings are shown in the matrix, using hatching. For each radar sensor, the corresponding operating range A or B is also indicated at the edge of the matrix. Due to the assignment of the operating ranges as a function of directional parameter r, it is apparent that for each pair of radar sensors, they have operating ranges A and B different from each other, when they are hostile to each other.

Figure 3:
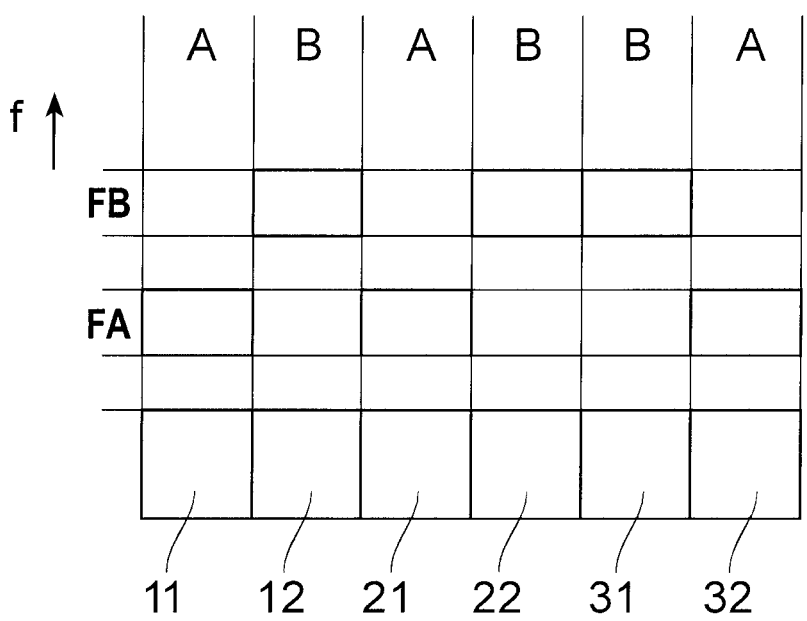
FIG. 3 shows an example of assigning frequency bands to the radar sensors shown in FIG. 1.

In FIG. 3, radar sensors 11-32 are situated on the horizontal axis, and the frequency f, at which these radar sensors operate, is plotted on the vertical axis. The radar sensors 11, 21, and 32, to which operating range A is assigned, operate in frequency band FA, and the three remaining radar sensors operate in frequency band FB. The frequency bands are staggered in such a manner, that they do not overlap each other, which means that practically no interference occurs.

The functions of the radar sensors of each of vehicles 1, 2, 3 are controlled by control units not shown, which receive data from the independent onboard navigation system of the respective vehicle. These data also include the directional parameter r, which is valid for the current road 4 and the current direction of travel of the vehicle itself and determines the assignment of operating ranges A and B.

Figure 4:
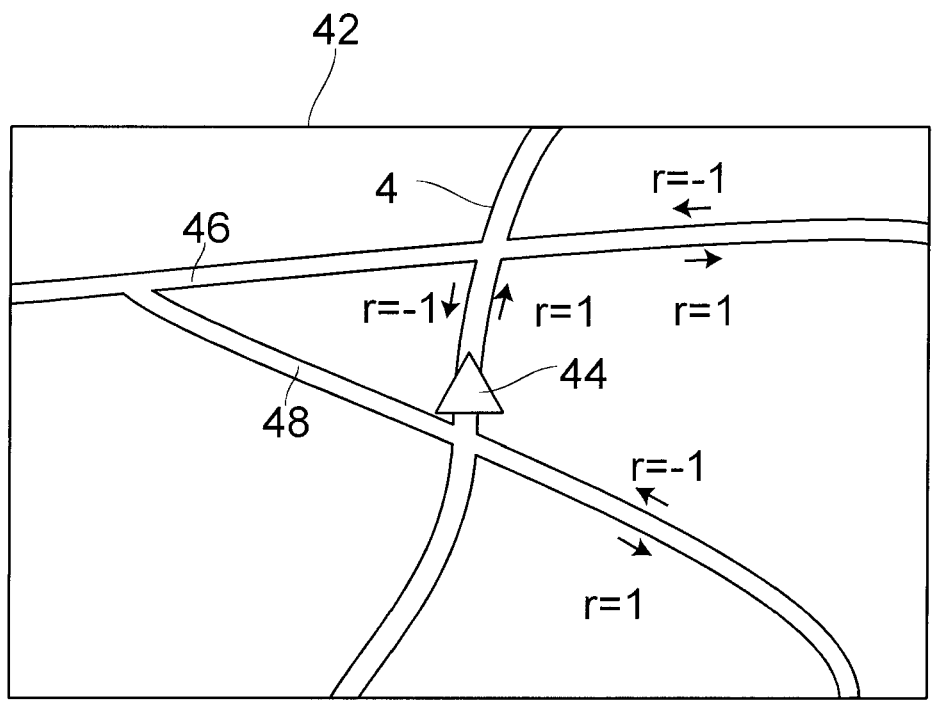
FIG. 4 shows a digital map of a navigation system, including assignment rules for the frequency bands of the radar sensors.

FIG. 4 shows an example of a digital map 42 including a section of a road network in the region, which is currently being traveled through by one of the vehicles, such as vehicle 1. The radar sensors obtain, from the navigation system, the information that the reference vehicle is currently located on road 4. Directional parameters r for each direction of travel are also stored in the digital map. As usual, the position and the direction of travel of the reference vehicle are indicated by a cursor 44. In light of this information, the operating ranges may be assigned in each vehicle in the manner described above in connection with FIGS. 1 through 3.

The section of digital map 42 shown in FIG. 4 includes further roads 46 and 48. For these roads 46 and 48, as well, a directional parameter, which indicates which direction of travel has the value 1 and which has the value −1, is stored for each direction of travel. Specific rules may be established for the selection of the directional parameters, for example, r=1 for the northern or eastern direction of travel and r=−1 for the southern or western direction of travel. However, since the course of the roads may be curved, the directional parameter may change during the trip on the same road.

One particularly reliable method for determining the directional parameters is to unequivocally assign each road and each direction of travel a directional parameter in a convention, which is binding for all navigation systems.

The operating ranges of the radar sensors may differ not only with regard to the frequency band, but also, for example, with regard to the time windows, within which the transmitting and receiving part of the radar sensor is active. Normally, the radar sensors for motor vehicles, for example, FMCW radar sensors, transmit a periodic sequence of frequency-modulated signals, in which activity time windows, in which transmission and reception occur, and inoperative windows, in which neither transmission, nor reception occur, alternate with each other. During the activity time window, the received data are digitized and stored and transferred to a processor, which then takes over the further processing. However, the evaluation of the digital data generally takes up more time than the collection of the data during a measuring phase. For this reason, the activity time windows are separated by the inoperative windows, in which the evaluation of the data recorded in the previous measuring period is completed.

Figure 5:
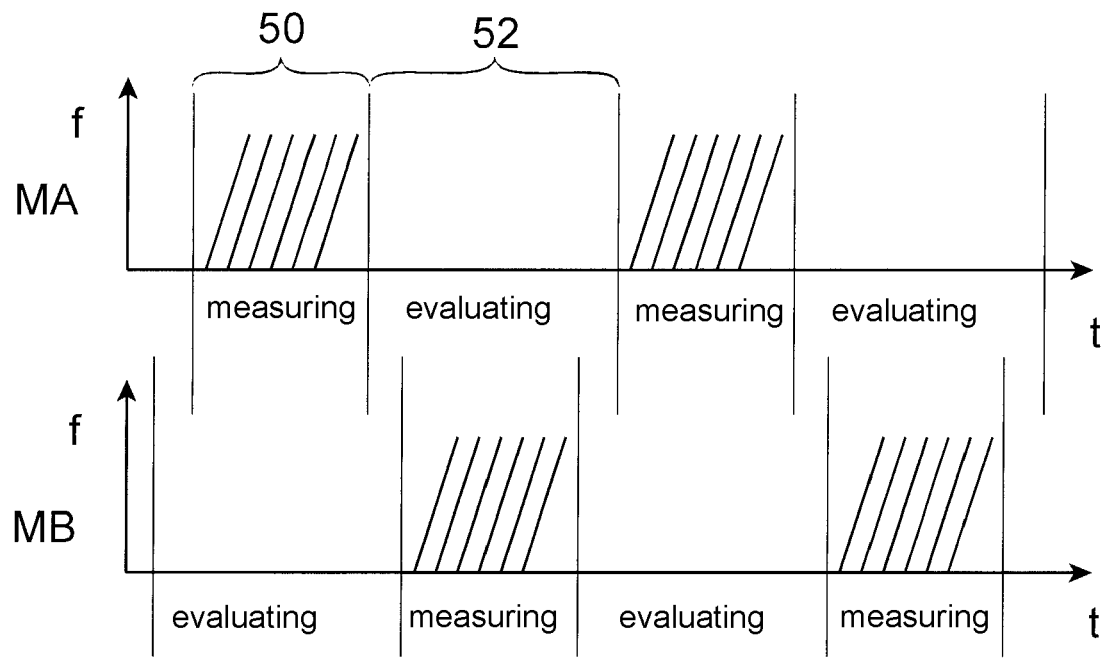
FIG. 5 shows frequency-time graphs for illustrating synchronization of activity time windows in the case of two radar sensors.

FIG. 5 shows an example of frequency modulation patterns MA and MB of two radar sensors. Each modulation pattern includes a periodic sequence of activity time windows 50, in which measuring is carried out, that is, radar signals are transmitted and received, and inoperative windows 52, in which the transmitting and receiving part is inactive and only an evaluation of the data takes place. In this case, modulation patterns MA and MB of the hostile radar sensors are synchronized in such a manner, that in each instance, activity time window 50 of the one radar sensor lies in inoperative window 52 of the other sensor. In this manner, interference between the signals of the two radar sensors is prevented. However, it is required that the local clock generators of the radar sensors, which determine the sequence of activity time windows and inoperative time windows, be synchronized with each other by a global time signal. The global time signal may be, for example, a signal, which is received by GPS satellites 40.

Therefore, in general, the operating ranges of the radar sensors may differ from each other not only with regard to the frequency bands used, but also with regard to the position of respective activity time windows 50. The number of available operating ranges may be increased, if the operating ranges are able to differ both with regard to the frequency bands and with regard to the activity time windows. It is equally possible for the radar sensors to transmit coded signals. In this case, the operating ranges may also differ with regard to the code symbols used.

Figure 6:
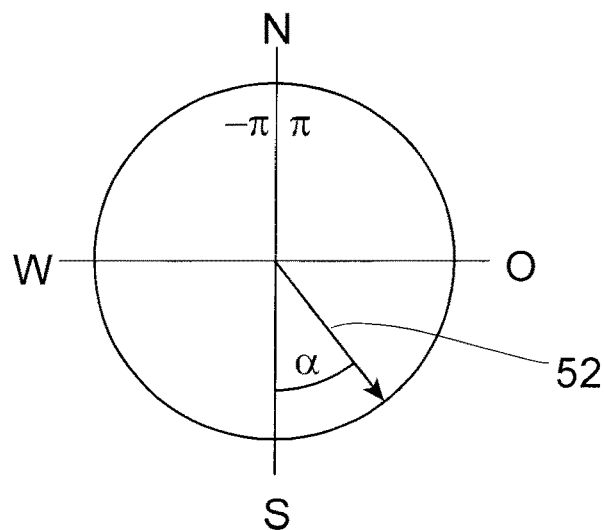
FIG. 6 shows a wind rose for explaining another specific embodiment of the method according to an example embodiment of the present invention.
Figure 7:
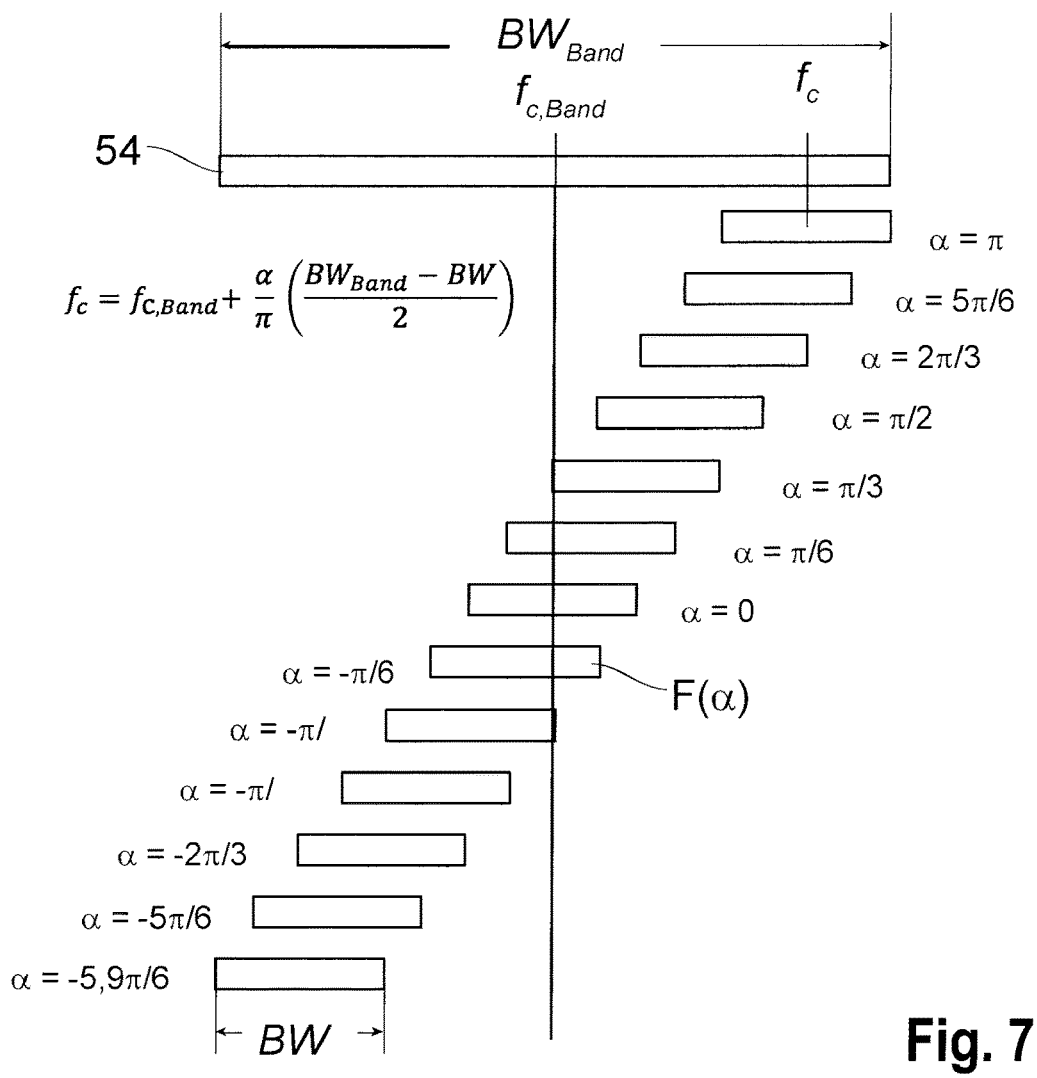
FIG. 7 shows an example of orientation-dependent assignment of frequency bands for a radar sensor.
Figure 8:
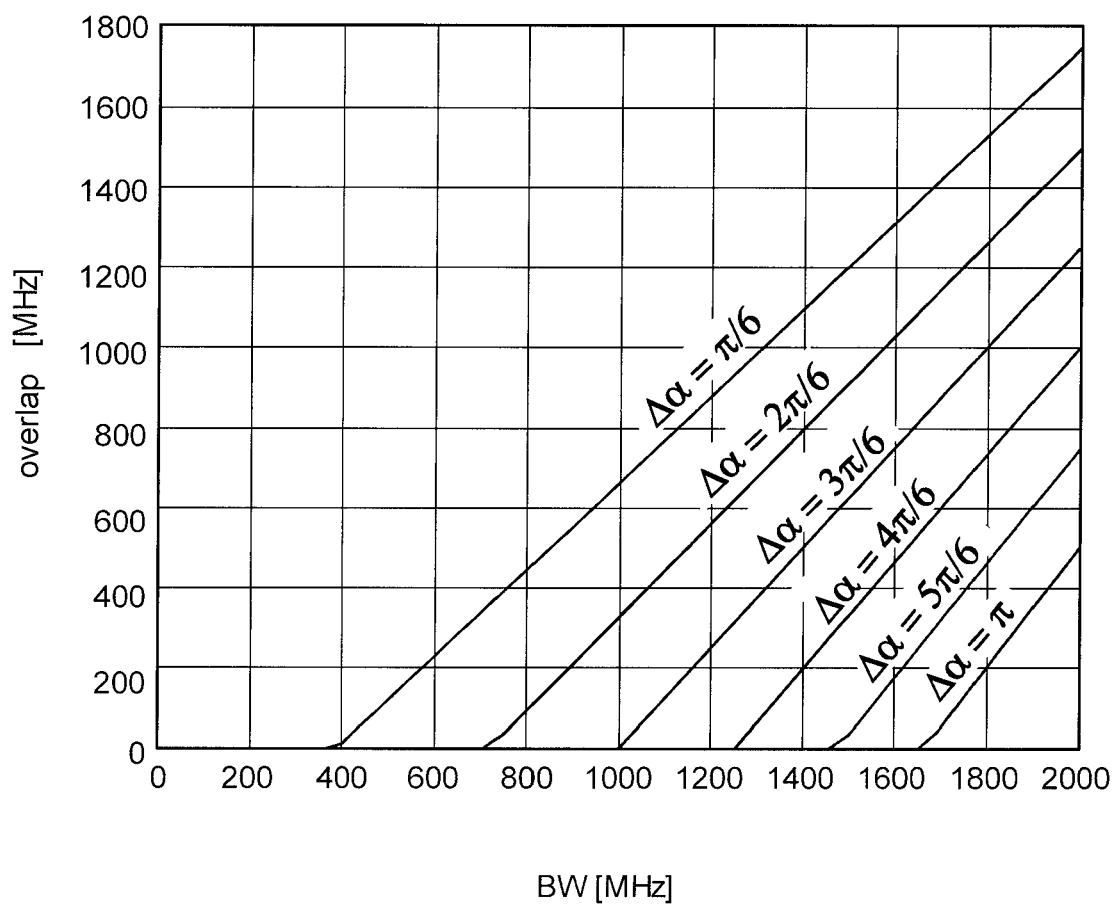
FIG. 8 shows a graph of frequency band overlap in the method according to FIGS. 6 and 7.

A modified exemplary embodiment, in which a larger number of different operating ranges are worked with and the assignment of the operating ranges takes place as a function of the orientation of the respective sensor in a global coordinate system, for example, relative to a particular cardinal direction, shall be explained in light of FIGS. 6 through 8.

A wind rose, in which an arrow 52 indicates the orientation (that is, the chief transmitting and receiving direction) of a radar sensor relative to the southern direction s, is shown in FIG. 6. The angle between arrow 52 and southern direction S is designated by α and varies in the interval (−π, π] (upper limit π belongs to the interval, but lower limit −π does not). Angle α may vary quasi-continuously or in certain increments, such as 1°, 15°, etc.

The operating ranges may also be characterized by a continuous parameter, such as center $f_c$ of the frequency band, the start of an activity time window, and the like. The assignment of the operating ranges is then determined with the aid of a function, which characterizes the parameter, the operating range, as a function of angle α.

FIG. 7 illustrates an example, in which the operating ranges are frequency bands F(α) having a fixed width BW and a center frequency $f_c$ varying as a function of angle α. All of the frequency bands lie with an overall band 54 having width $BW_{Band}$ and center frequency $f_{c,Band}$.

In the example shown, width BW of the individual frequency bands is one quarter of width $BW_{Band}$ of the overall band, and center frequencies $f_c$ are selected in such a manner, that the overall band is completely exhausted, when α is varied in the range of −π to +π, and that if two radar sensors are hostile to each other, that is, angles α of these two sensors differ by π (180°, the corresponding frequency bands do not overlap each other. The assignment of the frequency bands shown in FIG. 7 is based on the formula:

$$f_c = f_{c,Band} + (\alpha/\pi)(BW_{Band} - BW)/2.$$

If the difference between angles α of the two radar sensors becomes smaller, the corresponding frequency bands approach each other, and they start to overlap each other, if the angular difference becomes less than π/2 (90°). However, in this configuration, it is already highly improbable that radiation transmitted by one sensor is received directly by the other sensor.

The overlap between the frequency bands inevitably becomes larger, when width BW makes up a larger portion of overall width $BW_{Band}$.

For an overall band having a width $BW_{Band}=5$ GHz, the extent of the overlap of the frequency bands (in MHz) for different widths BW of the frequency bands (in MHz) and for different angular differences Δα between the orientations of the radar sensors, are represented graphically in FIG. 8.

What is claimed is:

1. A method for providing low-interference operation of a plurality of radar sensors, the method comprising:
   assigning each respective radar sensor of a plurality of radar sensors a respective operating range according to at least one degree of freedom of movement of a respective vehicle, in which the respective radar sensor is installed;

wherein each of the plurality of radar sensors is installed in a different respective vehicle and emit a transmission signal in the respective operating range, which is characterized by at least one of the following parameters: a frequency, a coding, and an activity time window, wherein a position of each respective vehicle is measured in a global coordinate system, and at least one degree of freedom, which is determinative for the assigning of the operating ranges, is a spatial coordinate of the respective vehicle in the global coordinate system, and wherein each respective radar sensor receives information about a road currently traveled on by the respective vehicle, from an independent onboard navigation system of the respective vehicle, wherein each road is assigned a respective directional parameter for each direction of travel on the road, and each directional parameter is stored in a digital map, wherein the information received by each respective radar sensor from the independent onboard navigation system includes the directional parameter which is assigned to the road currently traveled on by the respective vehicle for a direction of travel in which the vehicle is currently traveling, and wherein the operating range of each respective radar sensor is selected as a function of the respective directional parameter received from the independent onboard navigation system.

2. The method as recited in claim 1, wherein the operating ranges differ from each other in a position of a frequency band, in which the respective radar sensor transmits and receives.

3. The radar sensor as recited in claim 1, wherein the radar sensors transmit coded signals, and the operating ranges differ from each other with regard to code symbols used for coding.

4. The method as recited in claim 1, wherein the radar sensors are synchronized with each other by a universal time signal, and the respective operating ranges differ in a position of activity time windows, in which the radar sensor transmits and/or receives.

5. The method as recited in claim 1, wherein the degree of freedom, which is determinative for the assignment of the operating ranges, is an orientation of the respective vehicle with regard to a cardinal direction.

6. The method as recited in claim 5, wherein each operating range is characterized by a continuously varying parameter, and the operating ranges are assigned to each radar sensor according to a function, which assigns a value of the parameter to an angle, which indicates an orientation of the respective radar sensor with respect to the cardinal direction.

7. The method as recited in claim 6, wherein the operating ranges are assigned in such a manner, that for each pair of radar sensors, which are installed in two different vehicles, and whose spatial orientations are opposed to each other, the respective operating ranges of the two radar sensors are different from each other.

8. The method as recited in claim 1, wherein the operating ranges are assigned to the individual radar sensors as a function of an orientation of the respective radar sensor with regard to the respective vehicle.

9. A method for providing low-interference operation of a plurality of radar sensors, the method comprising:

assigning each respective radar sensor of a plurality of radar sensors a respective operating range according to at least one degree of freedom of movement of a respective vehicle, in which the respective radar sensor is installed;

wherein each of the plurality of radar sensors is installed in a different respective vehicle and emit a transmission signal in the respective operating range, which is characterized by activity time windows and at least one of a frequency and/or a coding, wherein each modulation pattern of hostile radar sensors includes a periodic sequence of the activity time windows, in which transmitting and receiving of radar signals occurs to obtain data, and inoperative windows, in which the transmitting and receiving are inactive and the data is evaluated;

wherein a position of each respective vehicle is measured in a global coordinate system, and at least one degree of freedom, which is determinative for the assigning of the operating ranges, is a spatial coordinate of the respective vehicle in the global coordinate system, and wherein each respective radar sensor receives information about a road currently traveled on by the respective vehicle, from an independent onboard navigation system of the respective vehicle, wherein each road is assigned a respective directional parameter for each direction of travel on the road, and each directional parameter is stored in a digital map, wherein the information received by each respective radar sensor from the independent onboard navigation system includes the directional parameter which is assigned to the road currently traveled on by the respective vehicle for a direction of travel in which the vehicle is currently traveling, and wherein the operating range of each respective radar sensor is selected as a function of the respective directional parameter received from the independent onboard navigation system.

10. The method as recited in claim 9, wherein the modulation patterns of the hostile radar sensors are synchronized so that an activity time window of one of the hostile radar sensors lies in an inoperative window of another of the hostile sensors, so as to prevent interference between signals of the hostile radar sensors.

11. The method as recited in claim 10, wherein local clock generators of the radar sensors, which determine a sequence of activity time windows and inoperative time windows, are synchronized with each other by a global time signal.

\* \* \* \* \*